N. McKUSICK.
MILK-PAIL.
No. 180,254. Patented July 25. 1876.
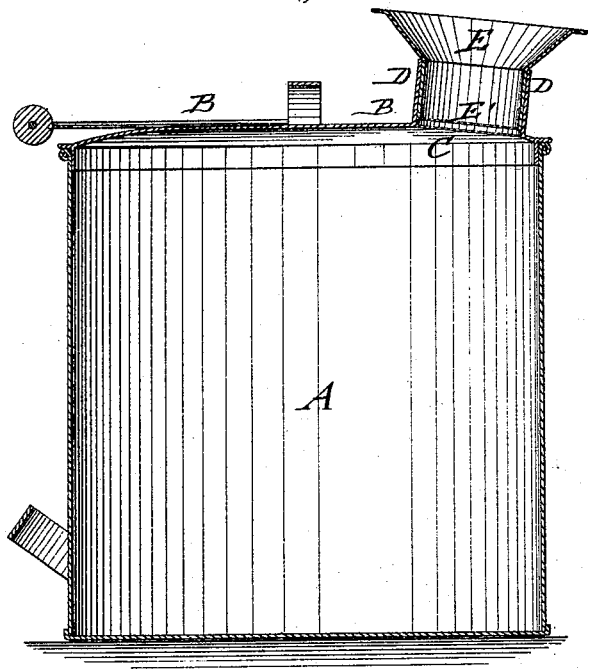
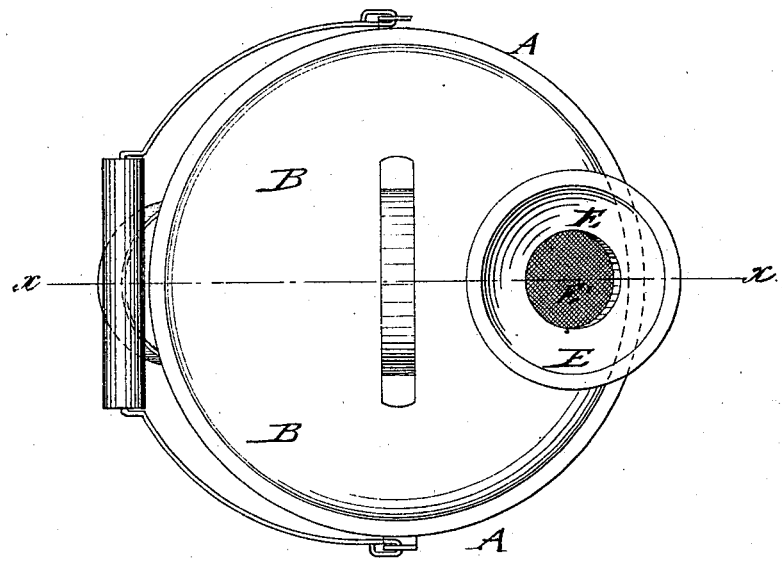
WITNESSES:
H. Rydquist
John Goethals
INVENTOR:
N. McKusick
BY
Munn & Co.
ATTORNEYS.

UNITED STATES PATENT OFFICE.

NEWTON McKUSICK, OF STILLWATER, MINNESOTA.

IMPROVEMENT IN MILK-PAILS.

Specification forming part of Letters Patent No. 180,254, dated July 25, 1876; application filed April 25, 1876.

*To all whom it may concern:*

Be it known that I, NEWTON MCKUSICK, of Stillwater, Washington county, Minnesota, have invented a new and Improved Milk-Pail, of which the following is a specification:

Figure 1 represents a vertical central section of my improved milk-pail on line $x\ x$, Fig. 1; and Fig. 2, a top view of the same.

Similar letters of reference indicate corresponding parts.

My invention refers to an improved milk-pail, by which the milk is protected against the admixture of any dirt, dust, or other foreign substances falling therein, the milk being also prevented from spilling when the pail is upset by the cow, so that it is kept in sweet and pure condition.

The invention consists of a pail with a cover having an opening closed by a strainer, and a detachable funnel with a second strainer, through which the milk passes into the pan.

A represents a milk-pail of suitable size, and B the detachable cover, that is provided with an aperture closed by a strainer, C. A socket-tube, D, around the strainer C, serves to retain a funnel, E, with a bottom strainer, E'. The funnel E is large enough to take up and convey the milk readily from the cow to the strainers. By taking out the funnel both strainers may be conveniently cleaned and the funnel replaced in a moment.

The double strainers prevent any foreign substances, however small, from passing into the milk, while the cover protects the milk against dust, hay, chaff, hair, or other dirt falling into the milk, and from getting tainted by the odors of the stable.

By the accidental upsetting or the kicking over of the pail by the cow little milk is spilled, as a small quantity only can escape through the strainer before the pail is set up again.

The pail may be easily kept clean in all parts, and may be used when the cover is removed for all purposes required.

Having thus described my invention, I claim as new and desire to secure by Letters Patent—

The combination of cover B, a strainer, C, closing the aperture of said cover, the socket-tube D around strainer, the funnel E, and the lower strainer E', all as shown and described, so that said cover may be readily removed and applied to any pail of proper size, and allow the pail to be used for any other purpose.

NEWTON McKUSICK.

Witnesses:
 H. R. MURDOCK,
 FRANK V. CAMFORT.